Feb. 3, 1970  P. D. BELLAMY ET AL  3,493,853
METHOD OF DETERMINING LOGIC CIRCUIT STABILITY BY
MATCHING TRANSMISSION LINE REACTIVE IMPEDANCE
TO CIRCUIT REACTIVE IMPEDANCE AND
DETECTING CIRCUIT OSCILLIATIONS
Filed July 11, 1968

INVENTORS
PAUL D. BELLAMY
DONALD P. REPCHICK

BY *James E. Murray*

ATTORNEY

United States Patent Office 3,493,853
Patented Feb. 3, 1970

3,493,853
METHOD OF DETERMINING LOGIC CIRCUIT STABILITY BY MATCHING TRANSMISSION LINE REACTIVE IMPEDENCE TO CIRCUIT REACTIVE IMPEDANCE AND DETECTING CIRCUIT OSCILLATIONS
Paul D. Bellamy, Poughkeepsie, and Donald P. Repchick, Wappingers Falls, N.Y., assignors to International Business Machines Corporation, Armonk, N.Y., a corporation of New York
Filed July 11, 1968, Ser. No. 744,180
Int. Cl. G01r 27/02
U.S. Cl. 324—57   10 Claims

ABSTRACT OF THE DISCLOSURE

This specification describes a method for determining if circuits are conditionally or unconditionally stable. The method involves the attaching of a variable length transmission line to the input of the circuit to be tested and varying the length of the transmission line while monitoring the output of the circuit. If there is a detectable change in the output of the circut during the variation in the length of the transmission line the circuit is conditionally stable, otherwise it is unconditionally stable.

BACKGROUND OF THE INVENTION

The present invention relates to the testing of semiconductor circuits and more particularly to the stability analysis of computer logic circuits.

In computers, circuits used to perform logic functions are usually mounted in pinned containers and called modules. These modules are tested individually prior to their insertion into a computer. Though these modules pass the tests they undergo, some of them may oscillate when they are inserted into a computer and are there subjected to particular load conditions. This is because the oscillating modules are conditionally stable. That is, under certain load conditions these modules are stable and under other load conditions they are not. Of course, it would be desirable beforehand to know whether a circuit is conditionally or unconditionally stable and it is well recognized that the circuit's stability can be determined by measuring the input impedance of the module to see if it has a negative real component. However, most schemes for performing such measurement are very complicated usually involving the use of a wheatstone bridge at a number of different frequencies to plot a stability analysis diagram such as Nyquist plot of the input impedance. Such methods while being very accurate are impractical on a large scale because of the amount of time and effort that goes into making such plots.

SUMMARY

In accordance with the present invention, a method is provided for rapidly determining if a circuit module is conditionally or unconditionally stable. This method involves the attaching of a variable length transmission line to the input of the circuit module to be tested and varying the length of the transmission line while monitoring the output of the circuit module. If there is any detectable change in the output during the variation of the transmission line the circuit module is conditionally stable, otherwise it is unconditionally stable.

Therefore it is an object of the present invention to provide a method of determining circuit stability of circuit modules.

It is another object of the present invention to determine if circuit modules are either conditionally or unconditionally stable, and It is a further object of the present invention to provide a method for rapidly determining whether circuit modules are conditionally or unconditionally stable.

DESCRIPTION OF THE DRAWINGS

The foregoing and other objects, features and advantages of the invention will be apparent from the following more particular description of the preferred embodiments of the invention as illustrated in the accompanying drawing of which:

Referring now to FIGURE 1, the current switch circuit 10 is being tested with a variable length transmission line 12 connected to one of its inputs 14 and a vacuum tube voltmeter 16 and a cathode ray oscilloscope 18 connected to its output 20.

Figure 1:
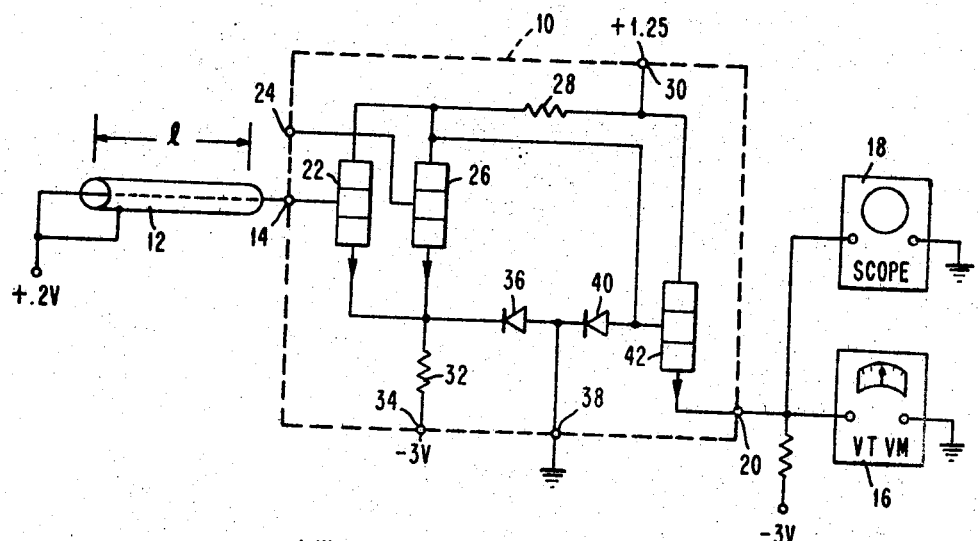
FIGURE 1 is a schematic of the method in accordance with the present invention being employed to determine whether a current switch logic circuit is conditionally or unconditionally stable.

The input 14 of the current switch is connected to the base of input transistor 22. The current switch has an additional input 24 which is likewise connected to the base of an input transistor 26. Both colletcors of input transistors 22 and 26 are connected through a resistor 28 to a positive 1.25 volt terminal 30 while the emitters of both transistors are connected through resistor 32 to a negative 3 volt terminal 34. The emitters of both the transistors 22 and 26 are also connected to the cathode of a diode 36 whose plate is connected to a grounded terminal 38. When both input transistors 22 and 26 are nonconducting, diode 36 is biased conducting by the potential supplied to it through terminals 34 and 38. However, when either transistor 22 and 26 conducts, diode 36 is biased off. An up input at terminal 14 will cause transistor 22 to conduct while a down input at the same terminal will render transistor 22 nonconducting. Likewise, up and down inputs on terminal 24 cause transistor 26 to conduct or be rendered nonconducting respectively.

Conductance and nonconductance of transistors 22 and 26 also controls the state of output transistor 42. The base of output transistor 42 is connected to the collectors of transistors 22 and 26 and through diode 40 to ground. The collector of transistor 42 is connected directly to the 1.25 volt terminal 30 and its emitter is connected to the output 20. While either transistor 22 or 26 is conducting transistor 42 is held at its down level by the voltage at the collectors of transistors 22 and 26. When both transistors 22 and 26 are nonconducting transistor 42 conducts at its up level due to a rise in potential at its base. Thus with an up input on either input terminal 14 or 24 there will be a down output at the output terminal 20 and with the down input on both terminals 14 and 24, there will be an up output on terminal 20.

Figure 2:
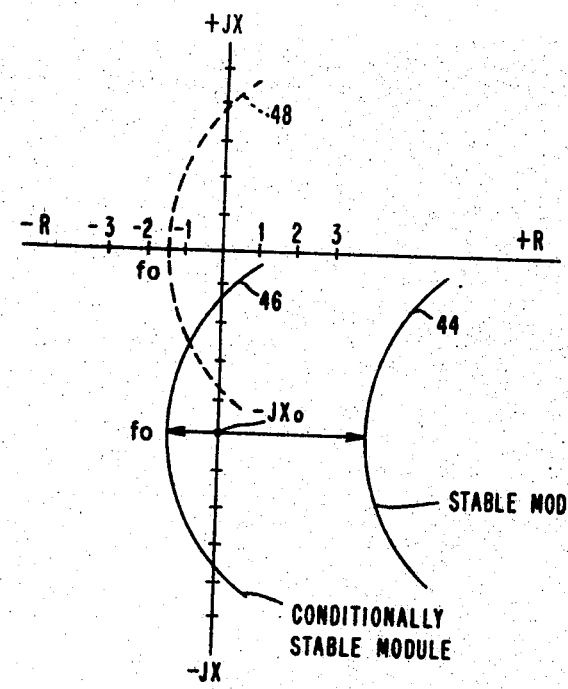
FIGURE 2 is a Nyquist plot showing what the input impedance of conditionally and unconditionally stable modules looks like and the effect of the present invention upon the input impedance of conditionally stable modules.

The current switch is a commonly used logic circuit, the one disclosed being an OR circuit with an out of phase output. A problem with current switch circuits is that their base connected input is capacitive while their emitter follower output is inductive. Thus the possibility occurs that when two or more current switch circuits are connected together, input to output, to perform some logic function, instability will occur in specific cases. FIGURE 2 should be helpful to show this. In FIGURE 2, there is a Nyquist plot showing various stability possibilities for the logic curit. Curve 44 is a typical input impedance curve for a stable current switch circuit. Such a circuit would not oscillate under any circumstances because it has no negative real portion in its input impedance. In other words the input impedance does not have any negative resistance. Curve 46 on the other hand is the input impedance of a conditionally stable module and contains a negative real portion. If the input to this current switch were shifted so that the curve encircled the zero point, as indicated by the dotted curve 48, the circuit would oscillate. Such a shifting could occur with the connection of the circuit into a computer where the inductive outputs of other current switch circuits are connected to the input. Thus an input characteristic such as curve 46 while appearing to be stable in the environment presented to it during testing would oscillate under certain conditions when presented with the proper loading on its input.

From the above discussion you can see that it would be desirable to know if the circuit module has any negative real input portion. The usual way of determining this would be to place the module in a wheatstone bridge and plot the input impedance at various frequencies to see if the curve for the circuit crossed over the $j$ axis of FIGURE 2. The running of such curves of course requires a skilled technician to perform the wheatstone bridge test and a significant amount of time to plot the points out on the curve to see if the circuit is in fact conditionally stable. This would be almost impossible to do in large scale manufacturing operations since it would be too time consuming.

Therefore in accordance with the present invention a new and simple method is devised for performing this test. This method can be rapidly performed by either a skilled operator or automatic detecting equipment.

Referring back to FIGURE 1, this method involves connecting a variable length transmission line 12 to one of the inputs 14 of the current switch module 10 under test and at the same time connecting a VTVM 16 and/or a scope 18 at the output of the circuit. The length of the variable length transmission line is then changed so as to change the load appearing at the input 14 to the current switch circuit 10. The variable length transmission line 12 is shorted at one end. Thus, as its length is changed it appears to be inductive or capacitive at the frequency $fo$ at which the input impedance 46 of a conditionally stable module exhibits its largest negative real portion. When the length $l$ of the transmission line is equal to from zero to one quarter the wave length at the frequency $fo$, the impedance presented at the input will be inductive and at some point between that length from zero to one quarter a wave length will exactly cancel out the capacitive impedance $-jX0$ of the module. Thus the input curve of the conditionally stable module 46 will be shifted so that it encircles the zero point on the curve as does the dotted curve 48. This will cause the module to oscillate and produce a signal that is detectable at the output terminal 20 of the module 10. This oscillation signal can then be picked up by the VTVM 16 or the oscilloscope 18 and indicates that the module is conditionally stable and is therefore not usable.

As can be seen this test is easily performed. All an operator has to do is hook up a transmission line 12 and the scope of VTVM to the module 10 and vary the length $l$ of the transmission line while examining the scope for any change at the output. Therefore unskilled help can be used to perform this test. The transmission lines used can be a sliding air dielectric variable transmission line such as a General Radio 874–50 adjustable stub. This is an air dielectric variable transmission line, the length of which is changed by moving a plunger back and forth. Thus to change the impedance, all that is required is to move a plunger back and forth to vary the length of the transmission line through the desired range. This simple method can be rapidly performed permiting quite a few modules to be tested in a short period of time.

The illustrated embodiment of the present invention involves testing a module with a capacitive charateristic. Of course the invention can be used equally as well on a module with an inductive input characteristic or upon the output terminal of the module since the variable length transmission line can be changed so as to appear capacitive at the necessary frequency since a shorted stub transmission line will appear capacitive when its length varies from one quarter wave length to one half wave length of the frequency at which instability might occur. Furthermore, if some degree of conditional instability is acceptable in the module, the test can be performed with a transmission line that is terminated with a resistor which will shift the point of oscillation so that the circuit will not oscillate if the stability of the circuit is within the acceptable limits.

While the invention has been particularly shown and described with reference to a preferred embodiment thereof it will be understood by those skilled in the art that various changes in form and details may be made therein without departing from the spirit and scope of the invention.

What is claimed is:

1. A method of testing a logic circuit to determine if the circuit is conditionally or unconditionally stable comprising coupling a variable length transmission line to the circuit, varying the length of the transmission line to match the reactive components of load and line impedances, and monitoring the circuit for oscillation so that the oscillation is an indication of circuit conditional stability at matched reactive impedances.

2. The method of claim 1 including coupling the transmission line to an input of the circuit.

3. The method of claim 1 including coupling the transmission line to an output of the circuit.

4. The method of claim 2 including varying the length of the transmission line from at least between zero to one quarter the wave length at any frequency into which there is a negative real portion to the input impedance.

5. The method of claim 3 including varying the length of the transmission line from at least between one quarter to one half the wave length at any frequency at which there is a negative real portion to the input impedance.

6. A method of testing a logic circuit to determine if the circuit is conditionally stable or unconditionally stable comprising coupling to the circuit one end of a variable length transmission line the other end of which is shorted, varying the length of the transmission line so that the transmission line impedance matches the reactive component of the load impedance on the transmission line at any frequency at which there is a negative real impedance to the load impedance on the transmission line, and monitoring the circuit for oscillation.

7. The method of claim 6 including coupling the transmission line to an input of the circuit.

8. The method of claim 6 including coupling the transmission line to the output of the circuit.

9. The method of claim 6 including varying the length of the transmission line from at least between zero to one quarter the wave length at any frequency in which there is a negative real portion to the load in the transmission line so as to match capacitive reactive components of that load.

10. The method of claim 6 including varying the length of the transmission line from at least between one quarter to one half the wave length at any frequency at which there is a negative real portion to the load on the transmission line so as to match inductive reactive components of that load.

References Cited

UNITED STATES PATENTS 2,932,789 4/1960 Drubin et al. _____ 324—57
3,283,180 11/1966 Pressman _____ 307—215

EDWARD E. KUBASIEWICZ, Primary Examiner

J. M. HANLEY, Assistant Examiner

U.S. Cl. X.R.

330—2